(12) United States Patent
Ko et al.

(10) Patent No.: US 9,346,695 B2
(45) Date of Patent: May 24, 2016

(54) APPARATUS FOR PURIFYING WASTEWATER AND METHOD THEREOF

(75) Inventors: Joo Hyung Ko, Incheon (KR); Kwan Yeop Kim, Incheon (KR); Yun Jung Kim, Seongnam-si (KR); Hyun Bae Kim, Incheon (KR); Hyoung Gun Kim, Seoul (KR); Hae Wook Nam, Incheon (KR); Hee Chul Yoon, Incheon (KR); Yu Seong Won, Incheon (KR); Jae Woong Park, Seoul (KR); Young Hwa Choi, Gunpo-si (KR)

(73) Assignees: POSCO ENGINEERING & CONSTRUCTION CO., LTD., Pohang-Si (KR); BLUEGREENLINK CO., LTD., Seoul (KR)

(*) Notice: Subject to any disclaimer, the term of this patent is extended or adjusted under 35 U.S.C. 154(b) by 0 days.

(21) Appl. No.: 13/822,021

(22) PCT Filed: Aug. 24, 2012

(86) PCT No.: PCT/KR2012/006755
§ 371 (c)(1),
(2), (4) Date: Mar. 21, 2013

(87) PCT Pub. No.: WO2013/154234
PCT Pub. Date: Oct. 17, 2013

(65) Prior Publication Data
US 2015/0021272 A1   Jan. 22, 2015

(30) Foreign Application Priority Data

Apr. 12, 2012   (KR) .................. 10-2012-0038024

(51) Int. Cl.
*C02F 1/24* (2006.01)
*C02F 9/02* (2006.01)
(Continued)

(52) U.S. Cl.
CPC . *C02F 9/00* (2013.01); *C02F 1/008* (2013.01); *C02F 1/24* (2013.01); *C02F 1/38* (2013.01);
(Continued)

(58) Field of Classification Search
None
See application file for complete search history.

(56) References Cited

U.S. PATENT DOCUMENTS 5,540,836 A * 7/1996 Coyne .................. 210/221.2

FOREIGN PATENT DOCUMENTS

| CN | 1962493 | 5/2007 |
|---|---|---|
| JP | 1990-290184 | 6/1992 |

(Continued)

OTHER PUBLICATIONS

The 1st Office Action issued on Dec. 23, 2014, SIPO(State Intellectual Property Office of the P.R.C), the corresponding Chinese patent application 201280056294.9.

*Primary Examiner* — Thomas M Lithgow
(74) *Attorney, Agent, or Firm* — Lex IP Meister, PLLC (57) ABSTRACT

The present inventions relates to an apparatus for purifying wastewater and a method thereof, which comprises: a stirring part to make bubbles impregnated into floc through high speed stirring by adding floc forming materials to influent and stirring them; an air supply part to supply air to the stirring part to make more bubbles impregnated; a pumping part to conduct pressurized conveying of the floc included treatment water; a cyclone part to separate high density floc to downstream and treatment water with low density floc to upstream from the pressurized treatment water; and a flotation part to separate floc from the treatment water with floc supplied from the cyclone part. Therefore, the present invention have an effect that it is possible to improve purification speed of wastewater and obtain good quality of purified water.

13 Claims, 5 Drawing Sheets

(51) Int. Cl.
*C02F 1/38* (2006.01)
*C02F 9/00* (2006.01)
*C02F 1/00* (2006.01)
*C02F 1/52* (2006.01)
*C02F 1/74* (2006.01)
*C02F 103/00* (2006.01)

(52) U.S. Cl.
CPC ............... *C02F 1/52* (2013.01); *C02F 1/5209* (2013.01); *C02F 1/74* (2013.01); *C02F 2103/00* (2013.01); *C02F 2209/01* (2013.01); *C02F 2209/11* (2013.01)

(56) References Cited

FOREIGN PATENT DOCUMENTS

| | | | | |
|---|---|---|---|---|
| JP | 2002-136803 | | | 5/2002 |
| JP | 2006-116390 | | | 5/2006 |
| JP | 2007130526 | A | * | 5/2007 |
| JP | 2007098890 | | * | 8/2007 |
| JP | 2012024737 | | | 2/2012 |
| KR | 10-2003-0065111 | | * | 3/2005 |
| KR | 10-0882200 | | | 1/2009 |

* cited by examiner

| COLLOID STATE | FORMATION OF MICRO FLOC | ADDITION OF MICROSAND | GENERATION OF BALLASTED FLOCCULATION |
|:-:|:-:|:-:|:-:|
| (a) | (b) | (c) | (d) |

Fig. 6

[Surface Erosion]

Fig 7.

[Large-Scale Fragmentation]

APPARATUS FOR PURIFYING WASTEWATER AND METHOD THEREOF

BACKGROUND OF THE INVENTION

1. Field of the Invention

The present invention relates to an apparatus for purifying wastewater and a method thereof, particularly relates also to an apparatus for purifying wastewater and a method thereof to receive wastewater, purify contaminants in it, and discharge purified clean water.

2. Background of the Invention

Nonpoint sources or sewer sediments are primarily flown into wastewater treatment plant with rainwater in rainfall and their huge volume often causes overload, so usually discharged to streams or sea without treatment. Therefore, their rapid treatment in the wastewater treatment plant has been required. Traditionally, a method to purify wastewater, which forms floc by adding coagulant to wastewater and removes the floc to purify wastewater, has been studied as one of purification manners.

However, the conventional method has used a method to make only high density floc over 1 g/cm$^3$ of density and make it settled or a method to make only low density floc below 1 g/cm$^3$ and floating on the water and make it floated. These methods had some problems, including long time required for forming and removing the floc, treatment difficulty for highly contaminated wastewater, and poor management to large fluctuation of flow rate and contaminant level such as rainfall.

SUMMARY OF THE INVENTION

An objective of the present invention is to provide an apparatus for purifying wastewater and a method thereof, which can improve quality of purified water as well as purification speed, can increase purification efficiency of wastewater by differentiating purification process, can save time and cost required for formation of the floc, can improve floc formation efficiency in stirring tank, and can improve recyclability of microsand.

In order to achieve the objective, the apparatus for purifying wastewater of the present invention comprises a stirring part to make bubbles impregnated into floc through high speed stirring during forming the floc included treatment water by adding floc forming materials to influent and stirring them; an air supply part to supply air to the stirring part to make more bubbles impregnated; a pumping part to conduct pressurized conveying of the floc included treatment water; a cyclone part to separate high density floc to downstream and treatment water with low density floc to upstream from the pressurized treatment water; and a flotation part to separate floc from the treatment water with floc supplied from the cyclone part. The apparatus for purifying wastewater of the present invention also comprises an influent measurement part installed on upstream of the stirring part to measure concentration of the influent; and a treatment water selection part installed between the stirring part and the pumping part to decide discharge of the influent with higher concentration than standard from the stirring part to the pumping part and discharge of the influent with lower concentration than standard from the stirring part to the flotation part on the basis of measurement results by the measurement part. The standard concentration of the present invention is set to 70~150 NTU.

The treatment water selection part consists of the first discharge pipe to discharge the treatment to the cyclone part; the second discharge pipe to discharge the treatment water to the flotation part; and a control valve to change discharge route of the treatment water.

The stirring part of the present invention stirs the treatment water with 240~360 rpm of speed for 2~4 min. The stirring part of the present invention consists of a stirring tank where metal salt coagulant, polymer coagulant aid, and microsand are added together. Or the stirring part consists of the 1$^{st}$ stirring tank where metal salt coagulant is added and the 2$^{nd}$ stirring tank where polymer coagulant aid and microsand are added.

On downstream of the cyclone part of the present invention, there are an in-line mixer and an assistant cyclone to retrieve microsand and recycle it by inserting it to the stirring part.

The pumping part of the present invention conducts pressurized conveying of the treatment water to 3~5 bar. The flotation part of the present invention separates low density floc via flotation by decompressing 3~5 bar treatment water naturally to atmospheric pressure, 1 bar treatment water.

In addition, the method for purifying wastewater of the present invention comprises: a step to form bubble impregnated floc by adding floc forming materials and air to influent and stirring them; a step to conduct pressurized conveying of treatment water with the floc; a step to separate high density floc from the pressurized treatment water; and a step to separate low density floc from the high density floc separated treatment water via flotation.

In addition, the method for purifying wastewater of the present invention comprises also: a step to measure concentration of the influent; a step to form bubble impregnated floc by adding floc forming materials and air to the influent and stirring them; a step to select floc separation process from the treatment water depending on the measurement results; a step to conduct pressurized conveying of the treatment water to separate high-density floc; a step to separate high density floc from the pressurized treatment water; and a step to separate low density floc from the high density floc separated treatment water via flotation.

As shown in the above, the present invention can not only improve purification speed of wastewater but also obtain excellent quality of purified water by forming bubble impregnated floc via addition of floc forming materials and high speed stirring. Moreover, the present invention also can make the bubble impregnated floc formed better by adding air with floc forming materials in the stirring part.

It is also possible to make the purification process different depending on concentration of the influent by separating high density floc and low density floc orderly by the cyclone part and flotation part or separating only low density floc by the flotation part, so as to improve the purification efficiency of wastewater.

It is possible also to save time and cost for floc formation by forming bubble impregnated floc within short time by high speed stirring in the stirring part.

It is possible also to improve the efficiency of floc formation in the stirring part by putting the floc formation materials into the separate stirring tank to form floc sequentially according to characteristics of the material.

The in-line mixer and the assistant cyclone installed on the lower part of cyclone part to retrieve microsand and recycle it by inserting it to the stirring part, so it is suggested that they provide an effect to improve recyclability of the microsand.

EXPLANATION OF SYMBOL

10: Stirring part 20: Pumping part
30: Cyclone part 40: Flotation part
50: Air supply part 60: Influent measurement part
70: Treatment water selection part 110: Collection vessel
120: In-line mixer 130: Assistant cyclone

DETAILED DESCRIPTION OF THE INVENTION

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Figure 1:
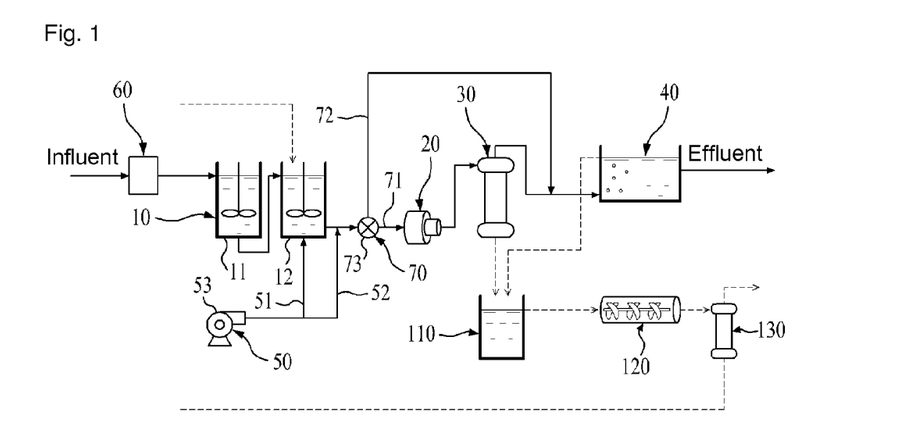
FIG. 1 is a block diagram showing the apparatus for purifying wastewater according to an example of the present invention.

FIG. 1 is a block diagram showing the apparatus for purifying wastewater according to an example of the present invention.

As shown in the FIG. 1, the apparatus for purifying wastewater of the present invention consists of a stirring part (10), a pumping part (20), a cyclone part (30), a flotation part (40), and an air supply part (50).

The stirring part (10), which is a stirring tank to form floc included treatment water by adding floc formation materials to the influent and stirring them, may also consist of a tank where all the floc formation materials are added and mixed or consist of multiple stirring tanks where the floc formation materials are added and mixed separately.

In other words, as the floc formation materials include a metal salt coagulant and a polymer coagulant aid, the stirring part (10) consists of a tank into which the metal salt coagulant and the polymer coagulant aid are added.

In addition, when microsand is used as an additional floc formation material, the stirring part (10) consists of a tank into which a metal salt coagulant, a polymer coagulant aid, and microsand are inserted together.

In addition, the stirring part (10) may consist of the first stirring tank (11) into which a metal salt coagulant is added and the second stirring tank (12) into which a coagulant aid is added. In addition, when microsand is used as an additional floc formation material, a coagulant aid and microsand may also be inserted to the second stirring tank (12) together.

Preferably, operation condition of the stirring part (10) is to stir at 240~360 rpm of speed for 2~4 min. It is because the stirring speed can be increased to make more bubbles impregnated in the floc, but the speed over 360 rpm or over 4 min has no significant effect on impregnation of bubbles. Thus the above condition is considered to be optimal.

Especially, when using both the first stirring tank (11) and the second stirring tank (12), it is desirable to maintain total stirring time to 2~4 min at 240~360 rpm of speed by stirring each tank at 240~360 rpm for 1~2 min.

The pumping part conducts pressurized conveying for the cyclone part (30) to facilitate separation of floc transferred from the stirring part (10). At this time, it is desirable that the pumping part pressurizes the treatment water to 3~5 bar. It is because lower pressure may cause lower separation efficiency in the cyclone part (30) and higher pressure may cause loss of unnecessary electric power or damage of the cyclone part (30) during its separation.

The cyclone part (30), which is a floc separation part to separate high density floc to downstream and treatment water with low density floc to upstream from the pressurized treatment water transferred from the pumping part (20), preferably consists of hydro cyclone.

The flotation part (40) is a flotation tank to receive the treatment water with low density floc from the cyclone part (30) and separate low density floc from the treatment water, where the treatment water pressurized in the pumping part (20) is decompressed naturally and the low density floc is floated and separated through expansion of bubbles impregnated in the floc.

Then, the purified water from which low density floc was separated would be discharged outward as effluent. Like this, the floated low density floc may be treated in separate sludge disposal process, which can use conventional equipment in a wastewater treatment plant.

In other words, the flotation part (40) floats and separates low density floc through natural decompression of treatment water at 3~5 bar with treatment water to atmospheric pressure, 1 bar.

The air supply part (50), which is an air supply device to supply air to the stirring part to make more bubbles impregnated in the floc, consists of the first air supply pipe (51) to supply air generated in a blower (53) to the stirring tank and the second air supply pipe (52) to supply air to the posterior end of stirring tank. Especially, it is desirable that the first air supply pipe (51) is connected and supply air to the second stirring tank (12) into which a polymer coagulant aid and microsand, when the stirring part consists of multiple stirring tanks. This air supply part (50) is an assistant device to make more bubbles impregnated in the floc, so may be excluded when sufficient bubbles are impregnated during stirring.

In addition, preferably the apparatus for purifying wastewater of the present invention may also comprise influent measurement part (60) and treatment water selection part (70) to allow separation of the low density floc by only the flotation part (40) without separation of the cyclone part (30), in case that turbidity of the influent is below 70~150 NTU.

The influent measurement part (60) is a measuring device which is established on upstream of the stirring part (10) and measures concentration of the influent flown into the stirring part (10) and it is desirable to use concentration measurement devices such as turbidity meter or MLSS (Mixed Liquor Suspended Solid) meter as the influent measurement part (60).

The treatment water selection part (70) is established between the stirring part (10) and the pumping part (20) to change a discharge route of the treatment water according to the measurement results from the influent measurement part and consists of the first discharge pipe (71) to discharge the treatment water to the cyclone part (30) and the second discharge pipe (72) to discharge the treatment water to the flotation part (40), a control valve (73) to change the discharge route of the treatment water.

In other words, the treatment water selection part (70) discharges the treatment water to the pumping part (20) through the first discharge pipe (71) under control of the control valve (73) to separate high density floc in the cyclone part (30).

In addition, the treatment water selection part (70) discharges the treatment water through the second discharge pipe (72) under control of the control valve (73) to separate low density floc. It is desirable to use an electric powered valve to change discharge route of the treatment water as the control valve (73). Therefore, the treatment water selection part (70) discharges the treatment water from the stirring part (10) to the pumping part (20) in higher concentration than standard or from stirring part (10) to the flotation part (40) in lower concentration than standard. It is desirable also to apply 70~150 NTU (Nepthelometric Turbidity Unit) as the standard value for selection of discharge route as like standard for separation between low and high density floc. Particularly it is more desirable to apply 100 NTU as this standard value.

When performing the present invention to the wastewater with ordinary turbidity of influent below 100 NTU, it is also possible to transfer the floc included treatment water generated in the stirring part (10) directly to the flotation part (40) to separate floc, omitting the pumping part (20), the cyclone part (30), and the treatment water selection part (70).

In addition, preferably the apparatus for purifying wastewater of the present invention comprises also a collection vessel (110), an in-line mixer (120), and an assistant cyclone (130), which are installed on downstream of the cyclone part (30) to retrieve microsand and recycle it by inserting it to the stirring part (10).

The collection vessel (110) is a storage container to collect and store high density floc discharged from the lower part of cyclone part (30) and low density floc discharged from the upper part of flotation part (40). The in-line mixer (120) is installed downstream of the collection vessel (110) and gives irregular impacts to floc to make microsand secede from the microsand combined floc.

The assistant cyclone is installed on downstream of the in-line mixer (120) and separates the floc and the microsand in state that the microsand secedes from the floc by the in-line mixer. Then, the microsand separated from the lower part of assistant cyclone (130) will be retrieved and reinserted to the stirring part (10).

In addition, the floc separated from the upper part of assistant cyclone (130) is treated with low density floc separated from the flotation part (40) in separate sludge disposal process, for which conventional equipment in wastewater treatment plant can be used.

Of course, these in-line mixer (120) and assistant cyclone (130) may be omitted in case that no microsand is inserted in the stirring part (10).

Figure 2:
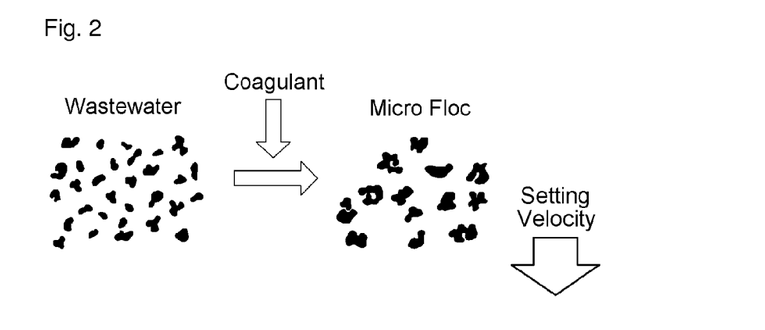
FIG. 2 is a mimetic diagram showing the floc formation process by the coagulant according to an example of the present invention.
Figure 3:
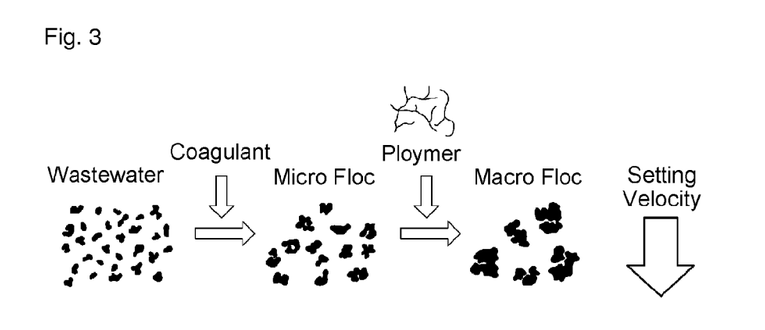
FIG. 3 is a mimetic diagram showing the floc enlargement process by the polymer according to an example of the present invention.
Figure 4:
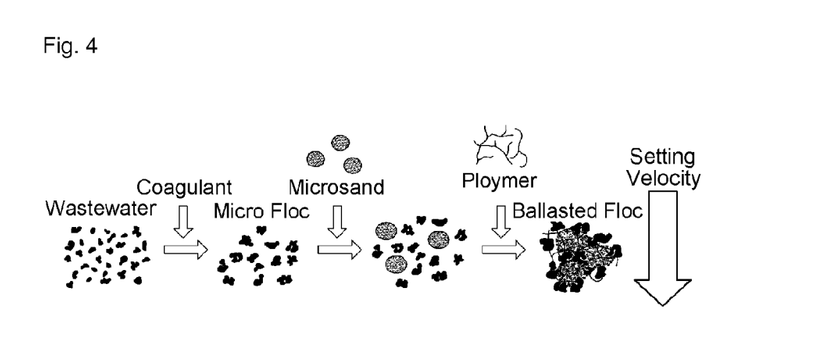
FIG. 4 is a mimetic diagram showing the floc density increase process by the microsand according to an example of the present invention.
Figure 5:
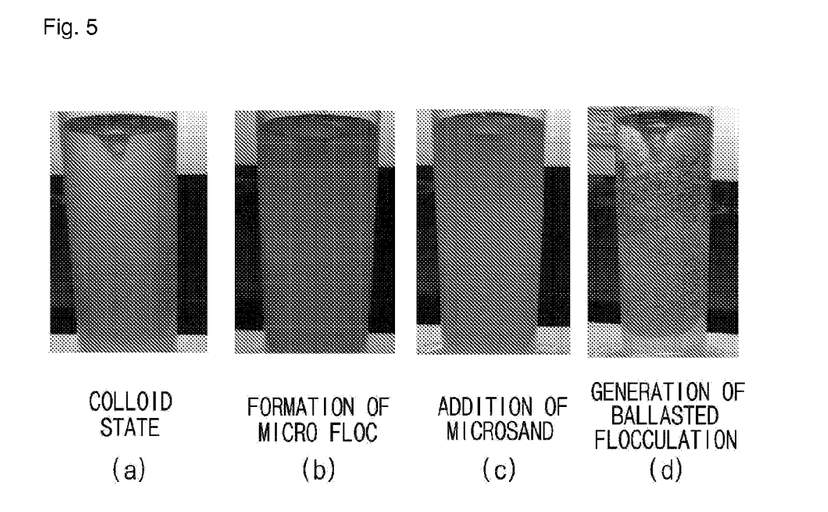
FIG. 5 are photos showing the ballasted flocculation reaction by steps according to an example of the present invention.
Figure 6:
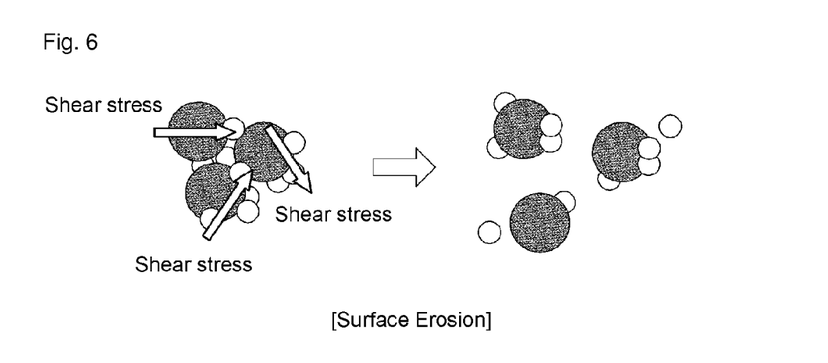
FIG. 6 and FIG. 7 are mimetic diagrams on 2 types of floc destruction according to an example of the present invention.
Figure 7:
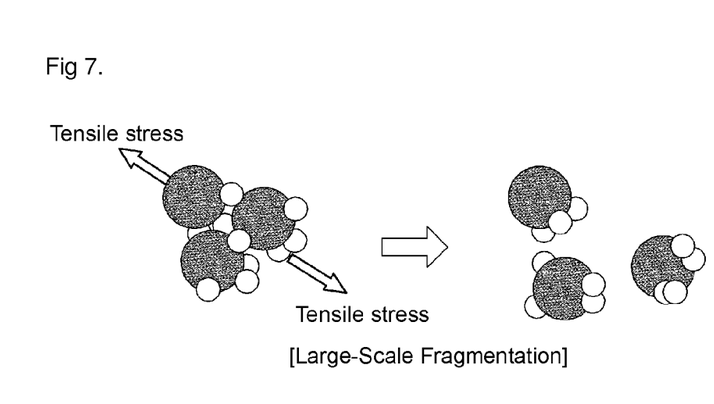
Figure 8:
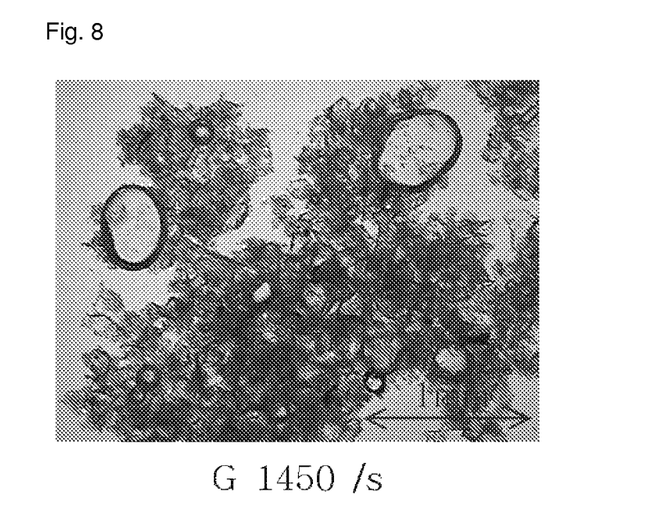
FIG. 8 and FIG. 9 are photos showing the bubble impregnated floc by cavitation according to an example of the present invention.
Figure 9:
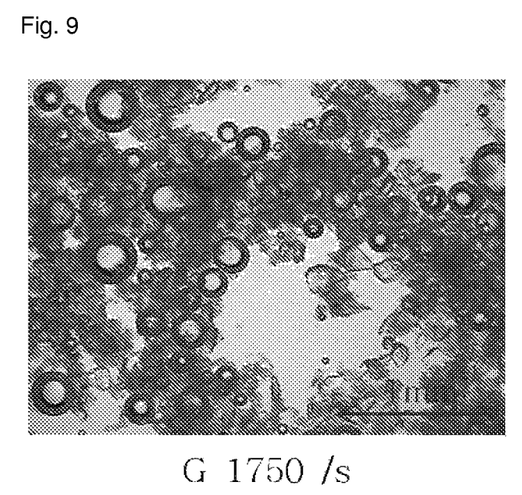

Hereinafter, the method for purifying wastewater according to an example of the present invention will now be described in detail referencing attached drawings. FIG. 2 is a mimetic diagram showing the floc formation process by the coagulant according to an example of the present invention; FIG. 3 is a mimetic diagram showing the floc enlargement process by the polymer according to an example of the present invention; FIG. 4 is a mimetic diagram showing the floc density increase process by the microsand according to an example of the present invention; FIG. 5 are photos showing the ballasted flocculation reaction by steps according to an example of the present invention; FIG. 6 and FIG. 7 are mimetic diagrams on 2 types of floc destruction according to an example of the present invention; FIG. 8 and FIG. 9 are photos showing the bubble impregnated floc by cavitation according to an example of the present invention; and FIG. 10 is a flow chart showing the method for purifying wastewater according to an example of the present invention.

Figure 10:
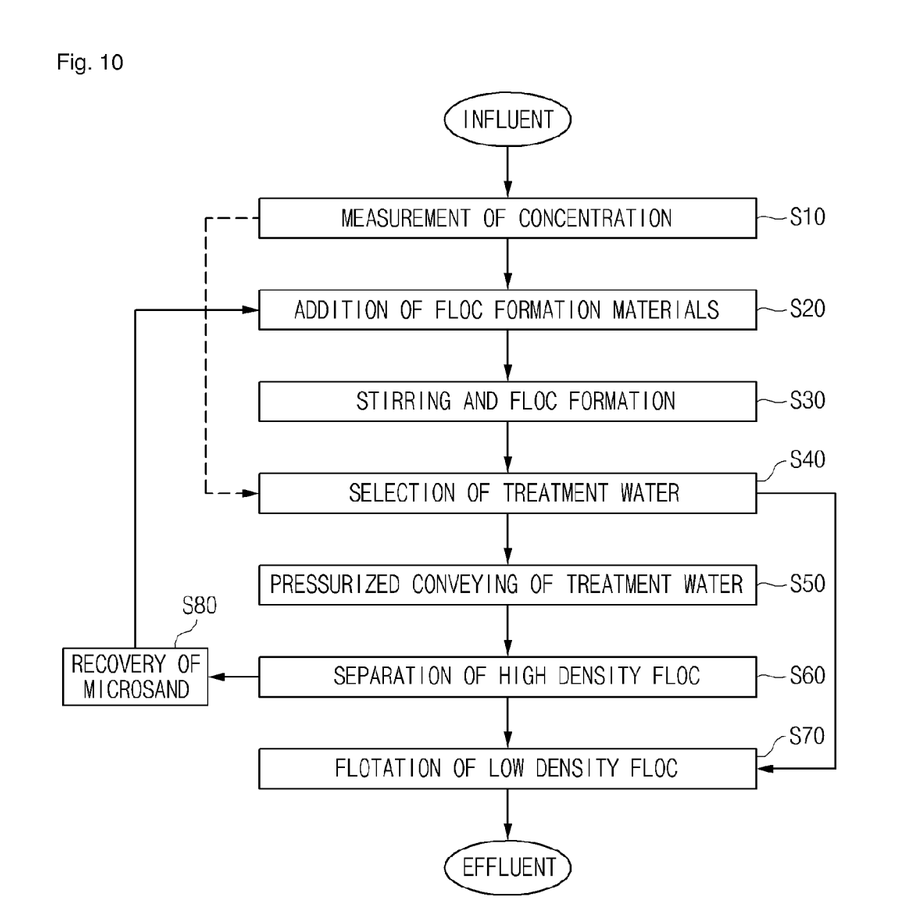
FIG. 10 is a flow chart showing the method for purifying wastewater according to an example of the present invention.

As shown in the FIG. 10, the method for purifying wastewater according to an example of the present invention is a method for purifying wastewater using the apparatus for purifying wastewater of the present invention; which comprises a step to add floc formation materials (S20), a step to stir them and form floc (S30), a step for pressurized conveying of treatment water (S50), a step to separate high density floc by hydro cyclone (S60), and a step to separate low density floc via flotation (S70).

In the step to add floc formation materials (S20), the floc formation materials such as a metal salt coagulant, a polymer coagulant aid and microsand are added to the stirring part where influent was flown and air is supplied from the air supply part (50).

Preferably, the floc formation materials to be added to the wastewater flown into as influent for floc formation comprise a metal salt coagulant and a polymer coagulant aid and more preferably, comprise microsand additionally.

In the step to stir them and form floc (S30), the influent to which the floc formation materials and air were added is stirred to form treatment water containing bubble impregnated floc.

When using these floc formation materials, it is possible to obtain high and low density floc more stably via ballasted flocculation reaction. In addition, the coagulant is a chemical agent to be added for unstabilizing colloid particles of wastewater and make them form floc.

Therefore as shown in FIG. 2, by adding a coagulant contains positive metal ions, repulsive power among particles are minimized, then the particles combine together to form floc.

The ballasted flocculation reaction is a method to increase settling velocity by combining high density particles such as microsand with floc using crosslinking effect of the polymer to make floc with high density and size.

The coagulant aids such as polymer have numerous polarity bond as a huge coil state as like a ball of thread, so combine with suspended particles and also cause coagulation by absorption among the floc combined with the suspended particles. Therefore as shown in FIG. 3, this reaction may play a role also in electrostatic bond and hydrogen bond during absorption reactive groups of the polymers existing as like loop in an aqueous solution are absorbed to the surface of particles.

Especially, the floc formed by only coagulant may has very small size and weak bond strength. When adding a polymer as a coagulant aid, the polymer is combined with the floc and causes additional coagulation with other floc, which is referred as double bond by the crosslinking effect.

Therefore as shown in FIG. 4, this crosslinking effect of the polymer can not only form larger floc to save settling time but also allow combination with other particles with higher density and larger size such as microsand.

FIG. 5 shows size change of floc according to actual injection of agent, wherein (a) shows colloid state, (b) shows formation of micro floc, (c) shows addition of microsand, and (d) shows ballasted flocculation.

The microsand used in the method for purifying wastewater of the present invention have 75~150 μm of size distribution and can generate floc with good density due to good bond strength. It is because the size of microsand over 150 μm shows high density but have insufficient bond strength and the size below 75 μm have excellent bond strength but shows relatively lower density of floc.

In addition, the floc may be affected largely by its formation conditions such as stirring strength and stirring manners. The stirring strength multiply velocity gradient (G) by stirring time (t), wherein when the G value is high, the number of collision among particles increases, so reaction rate and growth rate of the floc increase also. Characteristics of the floc may be different depending on the velocity gradient and the stirring time even at same stirring strength, the reason can be found in the principle of floc generation.

In addition, the floc is formed via repeated combination and destruction in collision during its coagulation process. The forms of floc destruction may be described as 2 manners. One is surface erosion as shown in FIG. 6 indicating that particles come off from the surface of floc and its size is reduced by shear stress from outside, which is caused by collision of the floc with inner wall and impeller during stirring.

The other is its splitting into several flocs with similar size by tensile force from outside of floc, which occurs when the floc has grown to a size difficult to maintain the combination during stirring.

Therefore, although the number of floc collision increases and its growth rate is accelerated at higher stirring strength, collision strength and shear stress from the outside and tensile strength on the floc increase also, so maximum growth limit size of the floc decreases but its density increases from fast repetition of combination and destruction.

In addition, although the number of floc collision decreases and its growth rate gets slower at lower stirring strength, the collision strength, the shear stress, and tensile strength on the floc decrease also, so it is likely that the maximum growth limit size of the floc increases and the floc with lower density from looser combination is produced.

From these results, when the stirring strength is weaker, the reaction time becomes longer and floc with larger growth limit size and lower density and strength is generated. This floc has lower density and strength, may be dissociated readily by rotary impact of the hydro cyclone. On the contrary, when the stirring strength is stronger, the reaction time becomes shorter and floc with smaller growth limit size but higher density and strength is generated.

On the stirring step of the present example, the floc capable of fast separation by hydro cyclone and fast flotation in the flotation tank was generated using this difference of stirring strength.

When an impeller is rotating at high speed, fluid pressure on surface of the impeller is decreases, and then vapor is generated where the fluid pressure is lower than saturated vapor pressure. This phenomenon is referred as cavitation. In the present example, the stirring speed was accelerated to 240~360 rpm to introduce cavitation.

Thus, air bubbles generated by high speed rotation of impeller in the flocculation reaction tank (stirring tank), and are impregnated among floc as shown as FIG. 8 and FIG. 9.

The step for pressurized conveying of the treatment water (S50) compresses the floc formed treatment water by pressure pump of the pumping part (20). In this step for pressurized conveying of the treatment water, the treatment water is pressurized for high speed operation in hydro cyclone of the cyclone part (30) keeping 3~5 bars of pressure, wherein the high density floc is removed primarily in the hydro cyclone and then the treatment water containing residual low density floc is depressurized naturally in the flotation tank of the flotation part (40) and the low density floc is floated and removed with impregnated bubbles. This pressurization of treatment water is done by pressurized conveying pump of the pumping part between the stirring part (10) and the cyclone part (30).

The step to separate high density floc (S60) separates high density floc form the pressurized treatment water by hydro cyclone of the cyclone part (30). The hydro cyclone is a liquid-solid separation equipment to separate particles by accelerating their settling velocity with the centrifuge force without mechanical operation.

This hydro cyclone, which discharges high density materials to a lower outlet and low density materials to an upper outlet, can separate materials only when density difference between solid particles included in the liquid and the liquid is apparent and as dynamic features of the solid particles included in the liquid may be different according to their size, morphology, density and concentration, it is rarely used in separation of floc with small size and density, low concentration, and unstable morphology.

The method for purifying wastewater of the present example generates floc with high size and density and excellent combination strength by introducing the ballasted flocculation reaction, so has several advantages that separation using hydro cyclone becomes more favorable and separation is possible at relatively small density difference in using hydro cyclone in the manner of fuzzy trap with relatively long residence time.

General hydro cyclone is composed of a cylinder shape where a cylindrical section and a conical section are combined. Suspended particles in the liquid is introduced in direction of tangent line through inlet located on upper side of the cylinder.

From the introduction in direction of tangent line, strong rotary power is initiated from inside, strong swirl motion occurs in the inside and centrifuge force is developed to accelerate movement of particles toward outer wall, so the particles start to move downward in spiral shape through the cylindrical section and the conical section.

Particles in strong vortex motion of the inside are affected by gravity, centrifuge force and drag force, the effect of gravity is smaller than those of others.

Fluid containing fine fraction moves to central part of the hydro cyclone from the effect of drag force, where forms a strong ascending current to be discharged through a central upper outlet.

Coarse fraction is interfered for inward flow of particles under the control of centrifuge force acting to cylindrical direction, so the particles moved toward inner wall loses their inertia force and flows along the wall of cylindrical wall to be separated and discharged in slurry or gruel through lower outlet.

In addition, the hydro cyclone has a merit also that when accelerating fluid velocity and increasing centrifuge force by elongating the cylindrical section, the residence time under high centrifuge force is made longer and it is possible to have higher separation efficiency even at smaller difference of density. Especially, when hydro cyclone with fuzzy trap is applied, it is more preferable because the flux discharged to the upper part can be increased to over 90%.

In the step to separate low density floc via flotation (S70), the high density floc separated treatment water, namely treatment water containing low density floc, is depressurized naturally to separate low density floc via flotation. Thus, the purified water from which low density floc was separated would be discharged outward as effluent.

This flotation is one of unit operations used in separating solid particles from liquid, which includes pressure flotation to float and separate particles by injecting micro bubbles to the liquid and vacuum flotation to make dissolved air to bubbles to perform flotation by making the liquid container vacuum.

The vacuum flotation makes particles floated on the surface of water by buoyancy developed by large amount of air bubbles. Therefore, the vacuum flotation can remove smaller and lighter particles within shorter time than settling. Preferably, the flotation of the present invention uses air as a flotation promoting material.

The pressure flotation method using air bubbles includes dissolved air flotation and diffused air flotation, of which removal efficiency can be increased by adding various chemical agents.

The dissolved air flotation is a method to make air bubbles by removing pressure after injecting air to pressurized wastewater and the diffused air flotation is a method to make air bubbles under atmospheric pressure, which makes air bubbles generated and suspended particles floated by injecting air directly to wastewater through a rotating impeller or an air diffuser.

The flotation step of the present example is featured by having no additional air injection or vacuuming of container difference from traditional methods.

Bubbles generated in the high speed flocculation reaction tank are impregnated into the floc and the floc is floated rapidly by natural depressurization by its conveying from the hydro cyclone to the flotation tank.

Most of the floc introduced to the flotation tank has low density which is advantageous condition for flotation. This floc generally has impregnated air bubbles inside of the floc. In addition, dissolved air in the treatment water as well as air bubbles impregnated in the floc are expanded by natural decompression to produce large amount of air bubbles, which make flotation speed of the floc faster dramatically.

In addition, preferably the method for purifying wastewater of the present example also comprises a concentration measurement step (S10) and a treatment water selection step (S40) in order to separate low density floc only in the low density floc flotation step without the separation step of high density floc depending on the concentration of influent.

In the concentration measurement step (S10), the concentration of influent introduced into the stirring part (10) is measured on upstream of the stirring part (10). Thus, in the treatment water selection step (S40), floc separation method is selected by changing discharge route of the treatment water on downstream of the stirring part (10) depending on the results of concentration measurement of the influent.

Of course, the method of the present invention can also comprise a microsand recovery step (S80) to retrieve microsand and recycle it by inserting it to the stirring part (10).

In the microsand recovery step (S80), the microsand included in high and low density floc of the treatment waster will be collected and reused by collecting, transferring, and re-inserting it to the stirring part (10).

In other words, the high density floc generated in the step to separate high density floc and the low density floc developed flotation step are collected in a collection vessel (110), then these floc are destructed and the microsand is collected and reused.

In order to reduce air bubbles of low density floc generated in the flotation part (40), it is possible also to stir at low speed in the collection vessel (110).

For the high density floc generated in the stirring tank, it is difficult to destroy and separate them with only separation process of hydro cyclone. Therefore, in-line mixer (120) was introduced to separate microsand from the high density floc. An eddy was made and destruction of floc was accelerated by increasing contact surface area of in-line mixer (120).

The in-line mixer (120) is an instrument which contains serial mixing elements fixed in the pipeline and mixes materials repeating fluid division, direction change, and recombination successively, which is used in the successive mixing operation of fluid.

The floc destroyed by the in-line mixer (120) and the microsand are separated by difference of density in the assistant cyclone (130). The low density floc is discharged into the upper part and transferred to the sludge disposal process and the microsand is separated into the lower part to be inserted and reused in the stirring part.

The mixture of floc destroyed by the in-line mixer (120) and microsand are separated in the assistant cyclone (130), where the floc is removed as sludge and the microsand is transferred to and reused in the stirring part (10).

As describe in the above, the present invention have an effect that it is possible to improve purification speed of wastewater and obtain good quality of purified water. In addition, it is possible also to generate air bubble impregnated floc better by injecting air with floc formation materials to the stirring part.

It is also possible to make the purification process different depending on concentration of the influent by separating high density floc and low density floc orderly by the cyclone part and flotation part or separating only low density floc by the flotation part, so as to improve the purification efficiency of wastewater.

It is possible also to save time and cost for forming floc by forming bubble impregnated floc within short time from high speed stirring in the stirring part.

It is possible also to improve the efficiency of floc formation in the stirring part by putting the floc formation materials into the separate stirring tank to form floc sequentially according to characteristics of the material.

The in-line mixer and the assistant cyclone established on the lower part of cyclone part to retrieve microsand and recycle it by inserting it to the stirring part, so it is suggested that they provide an effect to improve recyclability of the microsand.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for purifying wastewater comprising:
an influent measurement part for measuring turbidity of influent to be purified;
a stirring part connected to the influent measurement part receiving the influent, stirring the influent, wherein floc forming materials are added, to form flocs in the influent and to impregnate bubbles into the flocs;
an air supply part supplying air to the stirring part to impregnate more bubbles in the flocs;
a pumping part connected to the stirring part pressurizing the influent including flocs;
a treatment water selection part installed between the stirring part and the pumping part;

a cyclone part connected to the pumping part including an upstream and a downstream and separating the pressurized influent including flocs into an influent including high density flocs to be sent to the downstream and influent including low density flocs to be sent to the upstream; and a flotation part connected to the treatment water selection part and the upstream of the cyclone part, wherein the treatment water selection part discharges the influent with a higher turbidity value than a standard turbidity value from the stirring part to the pumping part and discharges the influent with a lower turbidity value than a standard turbidity value from the stirring part to the flotation part on the basis of the turbidity measurement by the influent measurement part, and wherein the flotation part receives the influent with the lower turbidity value than the standard turbidity value and the influent including low density flocs from the cyclone part and separates low density flocs from the influent with the lower turbidity value than the standard turbidity value and the influent including low density flocs from the cyclone part.

2. The apparatus of claim 1,
wherein the standard turbidity value is 70~150 NTU.

3. The apparatus of claim 1,
wherein the treatment water selection part consists of a first discharge pipe to discharge the influent to the cyclone part; a second discharge pipe to discharge the influent to the flotation part; and
a control valve to change discharge route of the influent.

4. The apparatus of claim 1,
wherein, the stirring part stirs at 240~360rpm for 2~4 min.

5. The apparatus of claim 1,
wherein, the stirring part consists of a stirring tank into which a metal coagulant and a polymer coagulant aid are added together.

6. The apparatus of claim 5,
wherein, microsand is added to the stirring tank.

7. The apparatus of claim 1,
wherein, the stirring part consists of a first stirring tank into which a metal salt coagulant is added and a second stirring tank into which a polymer coagulant aid is added.

8. The apparatus of claim 7,
wherein, the microsand and the polymer coagulant aid are added together into the second stirring tank.

9. The apparatus of claim 6 further comprising an in-line mixer and an assistant cyclone installed at the downstream of the cyclone part to retrieve and reuse the microsand.

10. The apparatus of claim 1,
wherein, the pumping part pressurizes the influent including flocs at 3~5 bar.

11. The apparatus of claim 10,
wherein, the flotation part separates the low density flocs from the influent via flotation by depressurizing the influent including low density flocs at 3~5 bar to 1 bar.

12. A method for purifying wastewater comprising:
measuring turbidity of the influent;
forming flocs in an influent to be purified and impregnating bubbles in the flocs by adding floc forming materials and air to the influent and stirring them;
separating the influent including flocs into an the influent with a higher turbidity value than a standard turbidity value and an influent with a lower turbidity value than a standard turbidity value based on a turbidity measurement from the step of measuring turbidity;
pressurizing the influent with the higher turbidity value than the standard turbidity value;
separating high density flocs from the pressurized influent with the higher turbidity value than the standard turbidity value; and
separating low density flocs from the influent with the higher turbidity value than the standard turbidity value and the influent with the lower turbidity value than the standard turbidity value via flotation.

13. The apparatus of claim 10,
wherein, the in-line mixer and the assistant cyclone are installed to retrieve and reuse microsand on downstream of the cyclone part.

\* \* \* \* \*